Oct. 16, 1962 W. S. BOYLE ET AL 3,059,117

OPTICAL MASER

Filed Jan. 11, 1960

INVENTORS: W. S. BOYLE
D. G. THOMAS
BY
Arthur J. Torsiglieri
ATTORNEY 3,059,117
Patented Oct. 16, 1962

3,059,117

OPTICAL MASER

Willard S. Boyle, Berkeley Heights, and David G. Thomas, Bernardsville, N.J., assignors to Bell Telephone Laboratories, Incorporated, New York, N.Y., a corporation of New York Filed Jan. 11, 1960, Ser. No. 1,487
5 Claims. (Cl. 250—211)

Figure 1:
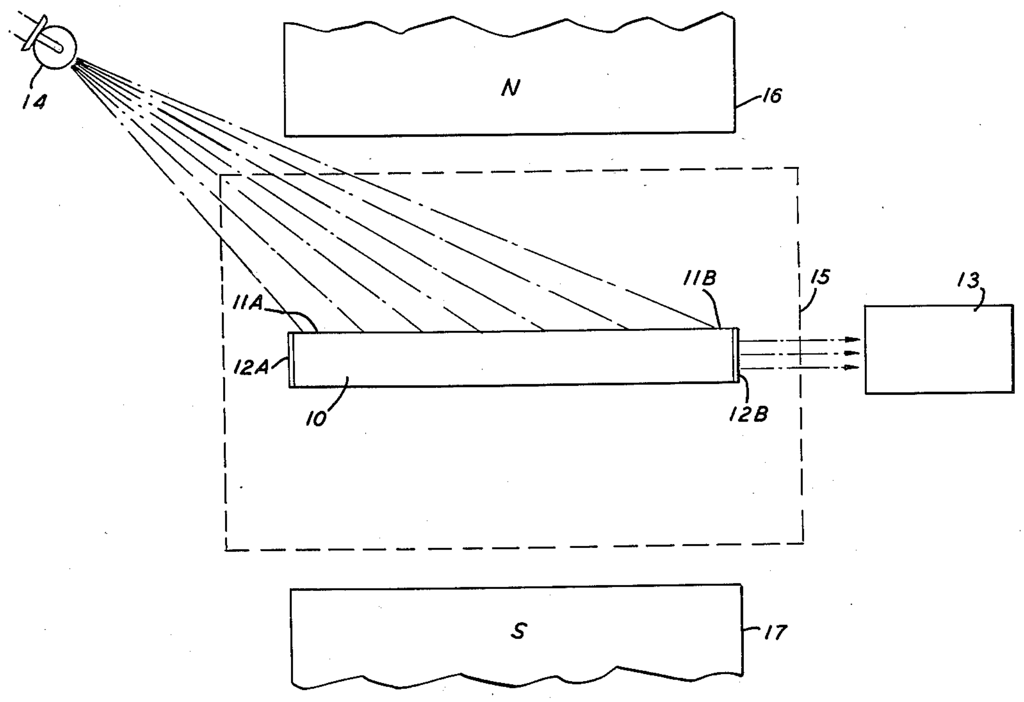

This invention relates to a solid state maser useful at optical wavelengths.

A paper entitled, "Infrared and Optical Masers," by A. L. Schawlow and C. H. Townes, Physical Review 112, 1940 (1958) describes some basic concepts of a maser useful at optical wavelengths. In particular, it is pointed out that by a suitable choice of an enclosure, a properly prepared system of radiating centers can be made to radiate coherently, amplify, and, in general, display at optical wavelengths most of the characteristics of a microwave maser of the kind known to workers in the art. In particular, there is pointed out the importance of a medium in which the density of radiating centers is high, the line width of the radiative transition narrow, and the pumping efficiency high.

The present invention is based on the discovery that certain optical transitions in semiconductors are particularly favorable for an optical maser in terms of the line width of the transition, the density of radiative centers obtainable, and the ease of pumping. In particular, the pumping can be either by the injection of minority carriers across a p-n junction within the semiconductor or by any incident ionizing energy suitable for producing hole-electron pairs in the semiconductor, such as light, electron beams, or X-rays.

However, to achieve maser action, it is important that the transitions predominantly be radiative and not absorptive. Several classes of systems will be described in accordance with the invention in which this desideratum is satisfied by making the probability of the radiative transition appreciably higher than the corresponding absorptive transition.

Additionally, to achieve coherent radiation it is in accordance with the invention to employ the semiconductive wafer as a mode isolator by treating the surface of the wafer so as to favor selectively the growth of a longitudinal mode.

In a first and preferred embodiment, a semiconductive wafer is appropriately prepared to have a pair of end faces parallel and highly reflective and the other surfaces suited for diffuse scattering. The wafer is doped with impurity atoms to create levels in its forbidden energy gap. The wafer is maintained at a very low temperature to minimize both the thermal ionization of the impurity atoms and the existence of phonons. The wafer is thereafter irradiated with light, advantageously pulsed, of wavelength suitable for creating hole-electron pairs in its interior. Their creation gives rise to excitons which temporarily become bound to the un-ionized impurity atoms. Each of these excitons, which serve as the useful radiative centers, thereafter recombines with the emission of a photon and a phonon. By operation at low temperatures where the phonon population is small the inverse process involving the absorption of a photon and a phonon can be made negligibly small. In this way, there is satisfied the requirement that the probability of the radiative transition exceed that of the absorptive transition, a necessary condition for maser action. Since this photon emission is characterized by a narrow line, utilization of the wafer as a mode isolator and the provision for passage of radiation out one of the two end faces result in a source of coherent light energy of the radiative frequency associated with the recombination of the exciton.

The requirement that the probability of the radiative transition exceed that of the absorptive transition can also be achieved with a minimum of phonon cooperation by supplying sufficient pumping power to provide that the number of un-ionized impurity atoms having excitons bound to them greatly exceeds the number free of excitons. In this way the possibility of absorptive transitions can be reduced to a value much less than that of radiative transitions.

The invention has application both as a generator of coherent radiation and as an amplifier of radiation of the appropriate wavelength.

Figure 2:
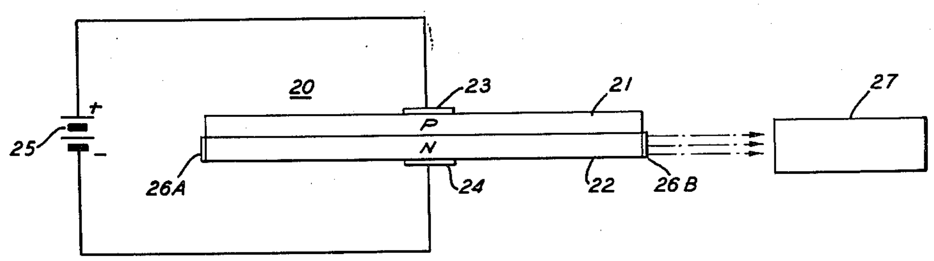

The invention will be better understood from the following more detailed description, taken in conjunction with the accompanying drawing, in which:

FIG. 1 illustrates an embodiment of the invention utilizing light to create hole-electron pairs in a semiconductive wafer uniformly doped with a single impurity; and FIG. 2 illustrates an embodiment utilizing the injection of carriers across a p-n junction into a semiconductive region uniformly doped with a single impurity.

With reference more particularly to the drawing, in FIG. 1 the semiconductive wafer 10 having a rectangular parallelepiped configuration is monocrystalline silicon doped with about $10^{16}$ phosphorous atoms per cubic centimeter but otherwise of high purity. The wafer is prepared to have its two ends 11A and 11B parallel to a high degree and very smooth. Advantageously, end 11A is coated with a thin film 12A of a suitable reflective material, such as aluminum, to make its reflectivity as high as possible, and end 11B is similarly coated with a thin film 12B, although this film is designed to permit several percent transmission therethrough. The light utilization load 13 is positioned to receive light transmitted through end 11B. The various other surfaces of the wafer are made rougher to cause diffuse scattering. Such a wafer will act as a mode isolator since a mode corresponding to transmission directly between the two ends can be made to suffer little attenuation from destructive interference, particularly if the length of the wafer corresponds to an integral number of half wavelengths of the energy being transmitted. However, other modes which involve multiple reflections from the side surfaces of the wafer are attenuated by the diffuse scattering at such surfaces.

A light source 14 providing high intensity pulses of light suitable for ionization of hole-electron pairs in the semiconductor is disposed to shine light on one major surface of the wafer. Mode isolation is easiest of the radiation generated at the center of the wafer so the light advantageously is concentrated there. In order to utilize efficiently the electron-hole pairs generated, the thickness of the wafer advantageously should not exceed by much the diffusion length of such carriers in the wafer. Additional mode isolation elements may be provided between end 11B of the wafer and the light utilization load 13 if desired. Such elements may take the form of a condensing lens and apertured plate combination.

Finally, the wafer is incorporated in a refrigerated enclosure shown schematically by the broken line 15. Naturally, the enclosure is provided with windows for the introduction of the pumping light energy and for the removal of the useful emitted radiation for utilization.

A typical arrangement includes a monocrystalline wafer of silicon five millimeters long, two millimeters wide, and two millimeters thick with the square faces parallel and highly reflective. The wafer is doped to include $10^{16}$ atoms per cubic centimeter of phosphorus and is kept at about four degrees Kelvin, the temperature of liquid helium. Pumping power of several kilowatts in a microsecond pulse is used. The useful energy emitted by this system has a wavelength of approximately 1.14 microns.

If the system described is to serve as a source of coherent light of such wavelength, it is sufficient merely to insure that the radiation emitted is sufficient to cause self-sustaining oscillations.

If the system described is to serve as an amplifier of incident light of such wavelength, it is necessary to supply such input light to be amplified. Typically, the input light is applied simply by permitting it to impinge on the wafer advantageously on the exposed surface intermediate between the ends.

The theory of operation is as follows: The incident pumping light energy gives rise to hole-electron pairs in the silicon wafer and these, in turn, create excitons in the medium temporarily bound to the un-ionized phosphorous atoms. These excitons subsequently recombine with the emission of a photon of characteristic wavelength and a phonon. Because of the low temperature of operation, the inverse process of the absorption of a photon and a phonon is highly improbable. Moreover, by operation at high pumping power levels most of the impurity atoms can be made to have excitons bound to them which further limits the possibility of absorptive recombination. As a result, the system emits radiation of the characteristic wavelength but does not absorb the emitted radiation. As a result, the emitted radiation builds up. By designing the wafer as a mode isolator as described, the mode corresponding to transmission longitudinally down the slab builds up, while other modes are attenuated by the diffuse scattering from the other surfaces. To insure that the length of the wafer will be appropriate for the constructive build-up of the emitted light waves at the two ends of the wafer, provision is made for tuning the wavelength of the emission to some extent. To this end, the wafer advantageously is positioned between pole pieces 16, 17 of an electromagnet whose field strength is adjusted to vary the wavelength of the emission to obtain the desired resonance condition in the wafer.

As previously mentioned briefly, various other techniques may be employed for creating hole-electron pairs in the wafer. These include bombardment of the wafer with high velocity particles such as electrons, ions, neutrons, or X-rays.

The electron-hole pairs needed for the creation of excitons can alternatively be generated by the injection of minority carriers into the wafer. In FIG. 2 there is shown an arrangement for achieving maser action in this way. In this embodiment there is included a semiconductive wafer 20 which includes a p-n junction separating p-type zone 21 from n-type zone 22. Electrodes 23 and 24 and the voltage source 25 are provided by means of which the junction is forward biased for the injection of minority carriers across the junction. Zone 21 is more heavily doped than zone 22 so that the most of the current across the junction is the result of the injection of holes into zone 22. For this situation, the zone 22 is designed to have its opposite end faces plane parallel and highly reflective. Advantageously, these faces are provided with thin coatings 26A, 26B as previously described, to enhance their reflectivity. Coating 26B is designed to permit transmission of the emitted light to the load 27. The other surfaces of the zone are designed to produce diffuse scattering.

Again, the wafer is refrigerated to keep the significant impurity little ionized and to keep the phonon concentration low. Also, a magnet (not shown) is provided to furnish a fine tuning magnetic field.

The principles of operation of this embodiment resemble those of that previously described. The significant difference is that in this latter embodiment the injection of minority carriers and the concomitant increase in majority carriers to maintain space charge neutrality are used as the source of electron-hole pairs which give rise to the creation of excitons.

A possible modification of the arrangements shown in FIGS. 1 and 2 utilizes as the active element a semiconductive wafer which at least in the active p-type portion includes both a shallow lying acceptor with small ionization energy and a deeper lying acceptor with a considerably larger ionization energy. The number of shallow lying acceptors is made much larger than the number of deep lying acceptors. Typical of shallow acceptors in germanium is boron. Typical of deep acceptors in germanium is gold. In other respects, the arrangements shown in FIGS. 1 and 2 are unchanged. The temperature of operation is chosen so that the shallow acceptor is ionized so that a large number of free holes are available, but the deeper lying acceptor is un-ionized so that it normally will be electrically neutral and so associated with a hole. In this condition, as electrons are introduced into the active p-type region either by the creation of hole-electron pairs under the action of incident light or by injectoin across a p-n junction, these electrons are trapped on the deep lying acceptor which acts as a recombination center. There will then be a radiative recombination in this center between the trapped electron and the hole normally associated therewith. This recombination will result in radiation of a discrete optical frequency and so be useful for the purposes of the invention. With the deep lying acceptor in this condition, the inverse of this last process can occur, the emitted photon being reabsorbed by other centers in the same condition. Such inverse absorptive process, if it occurred on a scale commensurate with the radiative process, would defeat the end of achieving maser action. However, this absorptive process is minimized by the inclusion of the large number of low lying acceptors to provide a large supply of free holes. These free holes quickly fall into the deep lying acceptors in which radiative recombination has occurred and thereby minimize the possibility that such acceptor will absorb emitted light.

Accordingly, in these modifications, as in the arrangements shown in FIGS. 1 and 2, light is emitted, and by the use of mode isolation techniques a particular longitudinal mode can be selectively built up and other modes discouraged whereby a supply of coherent monochromatic light energy is provided.

It can be appreciated that the specific embodiments described are merely illustrative of the general principles of the invention. Various other modifications may be devised without departing from the spirit and scope of the invention. In particular, various other semiconductive materials are useful in the manner described, including particularly gallium phosphide and cadmium sulphide.

What is claimed is:

1. An optical maser comprising a semiconductive wafer doped with a significant impurity, the wafer including a pair of surfaces which are plane parallel and coated for enhancing internal reflections, its other surfaces being such as to cause diffuse scattering, means for introducing ionizing energy into said wafer for creating electron-hole pairs therein, means for maintaining the wafer at a temperature such that said significant impurity is largely unionized whereby the creation of electron-hole pairs in the wafer results in the formation of excitons, said excitons subsequently experiencing radiative recombination, and means for utilizing the radiation resulting from such recombination which exits out of one of said plane parallel surfaces of said wafer.

2. An optical maser comprising a semiconductive wafer including two zones of opposite conductivity type for forming a p-n junction, one of the two zones having end surfaces which are plane parallel and coated for internal reflections, its other surfaces being such as to cause diffuse scattering, means connected to the wafer for biasing its p-n junction in the forward direction for injecting minority carriers into said one zone, means for maintaining the wafer at a temperature for keeping the significant impurity in said one zone substantially ionized and the phonon population low, whereby excitons are created in said one zone which experience radiative recombination, and means for utilizing the radiation resulting from such recombination which exits out of one of said plane parallel surfaces of said one zone.

3. An optical maser comprising a semiconductive wafer which is doped with a pair of impurities having different ionization energies, the wafer including a pair of surfaces which are plane parallel, and coated for enhancing internal reflections, means for introducing ionizing energy into said wafer for creating electron-hole pairs therein, means for maintaining the wafer at a temperature such that only one of the two impurities is ionized, and means for utilizing the radiation resulting from maser action which passes out through one of said plane parallel surfaces of said wafer.

4. An optical maser comprising a semiconductive wafer including two zones of opposite conductivity type for forming a p-n junction, one of the two zones having end surfaces which are plane parallel and coated for internal reflections, its other surfaces being such as to cause diffuse scattering, said one zone including a pair of impurities having different ionization energies, means connected to the wafer for biasing its p-n junction in the forward direction for injecting minority carriers into said one zone, means for maintaining said wafer at a temperature such that only one of the two impurities is substantially ionized, and means for utilizing the radiation resulting from recombination within the wafer which exits out of one of said plane parallel surfaces of said one zone.

5. An optical maser comprising a semiconductive element, means for introducing ionizing energy into said element for creating hole-electron pairs therein, means for maintaining the wafer at a temperature such that the creation of electron-hole pairs in the element results in the formation of excitons, said excitons subsequently experiencing radiative recombination, means cooperating with said element for forming a mode isolator of it, the radiation emitted in the isolated mode being sufficient to cause self-sustaining oscillations at a characteristic wavelength, and means for collecting and utilizing such oscillations.

References Cited in the file of this patent

UNITED STATES PATENTS

| | | |
|---|---|---|
| 2,692,952 | Briggs | Oct. 26, 1954 |
| 2,817,783 | Loebner | Dec. 24, 1957 |
| 2,929,922 | Schawlow et al. | Mar. 22, 1960 |
| 2,929,923 | Lehovec | Mar. 22, 1960 |

OTHER REFERENCES

Schawlow et al.: Physical Review; volume 112, No. 6, December 15, 1958, pp. 1940–1949.

Nicolosi et al.: Electronics (engineering edition), volume 31, number 27, July 4, 1958 (pp. 48–51).